Oct. 6, 1970

L. L. CHARLSON 3,532,447

FLUID OPERATED MOTOR

Filed Dec. 31, 1968

INVENTOR.
LYNN L. CHARLSON
BY
Robert H. Doyle
ATTORNEY

INVENTOR.
LYNN L. CHARLSON
BY
Robert H. Doyle
ATTORNEY

United States Patent Office 3,532,447
Patented Oct. 6, 1970

3,532,447
FLUID OPERATED MOTOR
Lynn L. Charlson, St. Louis Park, Minn., assignor to Germane Corporation, Minneapolis, Minn., a corporation of Minnesota
Filed Dec. 31, 1968, Ser. No. 788,285
Int. Cl. F01c 1/04
U.S. Cl. 418—61                                    8 Claims

ABSTRACT OF THE DISCLOSURE

An improved fluid operated motor of the axial valve type, wherein the valve is driven by the output shaft, but takes its alignment from the housing, and wherein the output shaft is supported in the housing independent of the valve, whereby the motor is capable of withstanding high radial loads on the output shaft.

This invention relates to improvements in fluid operated motors, and more particularly, to fluid operated motors of the axial valve type, wherein a motor capable of being subjected to high radial loads on the output shaft, is provided.

Although fluid operated motors of the axial valve type have been utilized in the past, the application of these motors has been greatly limited because of their lack of ability to function properly under either high operating pressures or with high radial loads at the output shaft. It should be noted that in motor designs heretofore known the presence of either a high operating pressure or a high radial load at the output shaft would cause inefficiencies, serious malfunction of the motor, or in many cases, complete failure.

In the past, fluid operated axial valve motors typically included an integral valve and output shaft. Application of this type of motor in a high radial load application at the output shaft results in wear of the shaft within the housing with a resultant transmission of the effects of this wear to the valve. This causes inefficient operation of the valve due to leakage paths created by misalignment of the valve within the housing. Further, valve wear occurs from its improper alignment while rotating in the housing. As wear progresses or as the operating pressure is increased, the inefficiency is increased. Correspondingly, as the radial load is increased, the misalignment between the valve and housing becomes greater, the wear rate increases and other malfunctions are introduced contributing further to the inefficiency of the motor until a point is reached at which the motor is no longer usable.

Although attempts have been made to isolate the valve from the output shaft, these attempts have either been unsuccessful, or have resuled in impractical motors. The overall size of the motor is of utmost importance and must be kept at a minimum. Consequently, the optimum design of the axial valve type motor requires that the valve is concentric with the shaft. This provides a shorter overall length of the motor. These design requirements, however, have previously resulted in motors incapable of operating efficiently at high pressures or at high raial loads on the output shaft.

Fluid operated motors which function properly at high operating pressures and with high radial loads on the output shaft, but which are unduly complicated and correspondingly expensive, are obviously undesirable.

With these comments in mind, it is to the elimination of these and other disadvantages to which the present invention is directed, along with the inclusion therein of other novel and desirable features.

An object of this invention is to provide a new and improved fluid operated motor of simple and inexpensive construction and operation.

Another object of this invention is the provision of a novel fluid operated motor of the axial valve type having an output shaft capable of with standing high radial loads.

Still another object of this invention is the provision of a fluid operated motor of the axial valve type capable of functioning efficiently under high operating pressures.

A further object of this invention is the provision of a novel fluid operated motor wherein the valve is driven by the output shaft and is concentric therewith, but takes its alignment from the housing, and wherein the output shaft is supported in the housing independent of the valve whereby the motor is capable of withstanding high radial loads at te output shaft.

A still further object of this invention is the provision of a fluid operated motor capable of efficient and long life operation under high pressures and high radial loads in that normal wear of the motor components does not efficient operation of the motor.

An additional object of this invention is the provision of a fluid operated motor having a detachable connection between the valve and the shaft, whereby foreign matter in the operating fluid, which would otherwise damage the valve, allows the valve to release from the shaft, thereby stalling the motor and preventing damage.

These and other objects and advantages of this invention will more fully appear from the following description made in connection with the accompanying drawings, wherein like reference characters refer to the same or similar parts throughout the several views, and in which.

Figure 1:
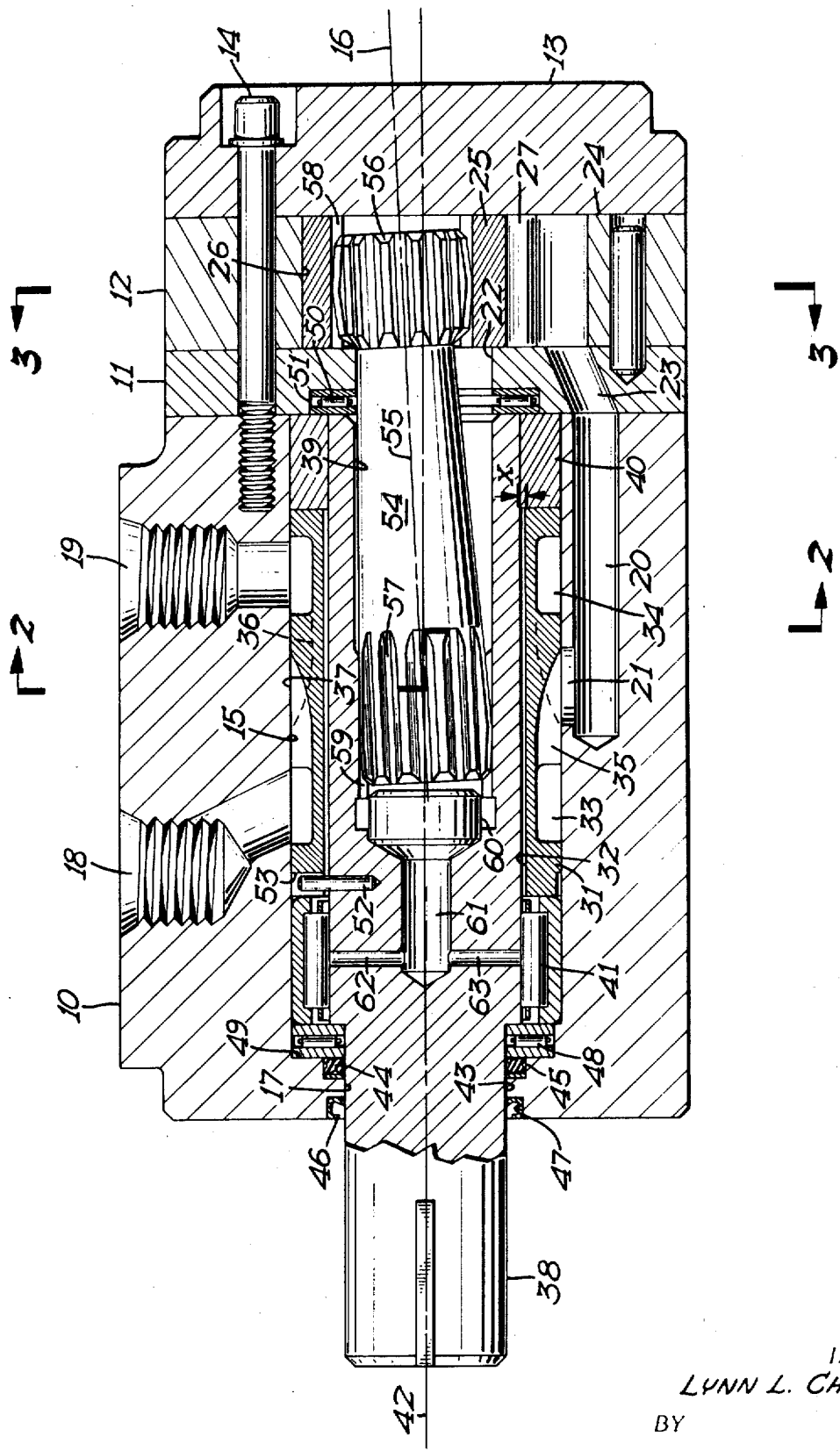
FIG. 1 is a longitudinal sectional view of a fluid operated motor, taken along the line 1—1 of FIG. 2.

The fluid operated motor shown in FIG. 1 is generally cylindrically shaped and comprises several sections. A valve housing is indicated at 10. A valve plate section 11 is positioned adjacent valve housing 10, and an internal gear set section or gerotor set 12 is positioned adjacent valve plate section 11, sandwiching valve plate section 11 between valve housing section 10 and internal gear set section 12. An end cover plate 13 is positioned adjacent internal gear set section 12, sandwiching internal gear set section 12 between the end cover plate 13 and the valve plate section 11. A plurality of axially extending bolts 14 join the end cover plate 13 with gerotor set 12, valve plate section 11 and valve housing 10 forming a generally cylindircally shaped motor frame or body.

Valve housing 10 includes a valve receiving bore 15 extending axially thereof along the axis of the motor as indicated by the motor axis or housing centerline 16. A counterbore 17 concentric with bore 15 is provided and is adapted to receive a motor sealing assembly. Internally threaded ports 18 and 19 are provided in valve housing section 10 to conduct inlet fluid and exhaust fluid; depending upon the desired direction of rotation of the output shaft, one port would conduct inlet fluid, the other exhaust fluid. Ports 18 and 19 communicate with valve receiving bore 15. Valve housing section 10 also includes a plurality of axially extending and radially spaced fluid passages 20. Each fluid passage 20 includes an opening 21 providing fluid communication between fluid passage 20 and valve receiving bore 15.

Valve plate section 11 includes bore 22, which is concentric with valve receiving bore 15 and housing centerline 16 of valve housing 10. Valve plate section 11 includes a plurality of angulated fluid receiving passages 23 corresponding in number and position and in fluid communication with the plurality of passages 20 of valve housing section 10.

Figure 3:
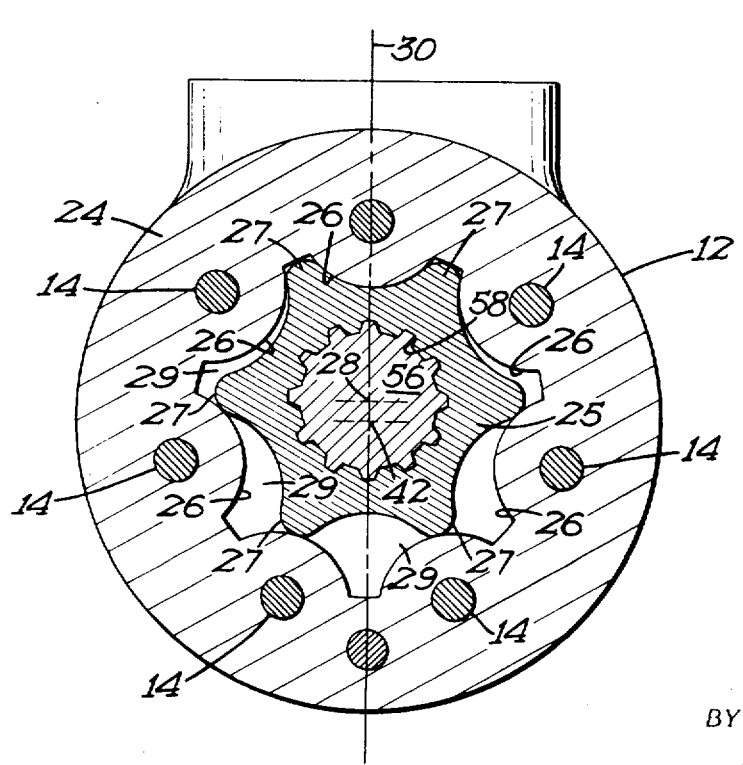
FIG. 3 is a sectional view taken along the line 3—3 of FIG. 1.

Referring now to internal gear set section 12, the construction thereof is best shown in FIG. 3. Gerotor set 12 comprises an external ring member 24 and mating internal star member 25. Ring member 24 has a plurality of internal teeth 26 and mating star member 25 has a plurality of external teeth 27 numbering one fewer than the number of internal teeth of ring member 24. Star member 25 is eccentrically disposed in ring member 24. Star member 25 orbits relative to ring member 24 about motor axis centerline 16 and rotates on its axis 28. During this orbital movement the external teeth 27 of the star member mesh with the ring member teeth in sealing engagement to form expanding and contracting cells 29 which are equal in number to the number of teeth of ring member 24, and in fluid communication with passages 23 in valve plate 11.

A line of eccentricity of the gerotor or internal gear set 12 is shown by centerline 30 and is defined as that line which passes through axis 28 of the star member 25 and axis 16 of ring member 24. The line of eccentricity constantly rotates during operation of the gerotor set and may be considered to separate the pressure side from the exhaust side of the gerotor set. During this rotation, however, the line of eccentricity always passes through axis 16 and axis 28. The star and ring members are typically constructed of hardened steel, although other materials may be used if desired.

Figure 2:
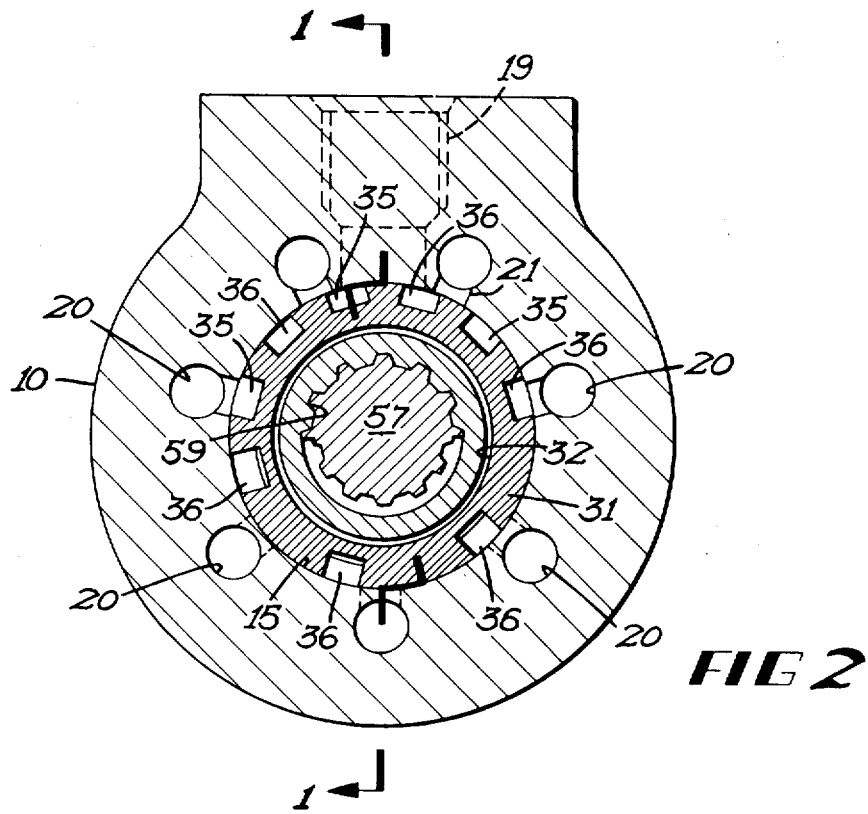
FIG. 2 is a sectional view taken along the line 2—2 of FIG. 1.

Referring now to FIG. 2, a cylindrically shaped axial valve 31 having an outer diameter corresponding to the inner diameter of bore 15 is shown positioned in bore 15 of housing 10 in precision rotative fit relative thereto. Valve 31 is a communicating type valve and includes bore 32 therein adapted to receive a shaft substantially concentric therewith. Valve 31 includes a pair of annular and axially spaced ring grooves 33 and 34, positioned thereon whereby constant fluid communication is maintained between port 18 and annular ring groove 33 and port 19 and annular ring groove 34 respectively. A plurality of axially extending slots 35 extend from annular ring groove 33 whereby, in predetermined positions of valve 31 relative to valve housing 10, fluid communication is provided between slots 35 and housing openings 21 and then to passages 20. Axially extending slots 36 extend from annular ring groove 34, and are positioned between slots 35 whereby communication with valve housing openings 21 is provided at predetermined intervals during the rotation of the valve relative to the housing. The valve rotates in synchronism with the rotation of star member 25 and slots 35 (and slots 36) correspond in number to the number of teeth 27 of star member 25.

In the motor shown, star member 25 has six teeth 27 and, correspondingly, valve 31 includes six slots 35 and six slots 36 positioned therebetween. The valve rotates in bore 15 with valve surface 37 in precision fit therewith, providing the tightest fit possible, yet allowing the valve to rotate. The valve is typically constructed of hardened steel and rotates in the cast iron housing. Of course, other materials may be used and, in fact, there may be some advantages to using a bronze sleeve in the housing in which the valve would rotate.

Output shaft 38, typically constructed of hardened steel, includes bore 39 and is assembled in valve receiving bore 15 of valve housing 10, supported therein by rear sleeve bearing 40 and front roller bearing 41. Output shaft 38 is substantially concentric within valve bore 32 and has an outside diameter less than the diameter of bore 32, approximately two percent less in diameter; the clearance therebetween shown by dimension X. The centerline of output shaft 38 is indicated at 42 coextensive with axis 16 in FIG. 1. Rear and front bearings 40 and 41, respectively, have outside diameters substantially equal to the diameter of bore 15 and a press fit therebetween is utilized to assemble the bearings in the housing. It should be noted that commercially available bearings do not have tolerances necessary to maintain the alignment of the shaft in the bearings in the same high degree of alignment that can be obtained for the alignment of the valve within the housing from precision machining. This fact greatly increases the need for separating the shaft from the valve whereby the valve does not take its alignment from the shaft; but rather from the housing in which way greater fit therebetween can be effected, greatly reducing the leakage paths surrounding the valve during its rotation within the housing.

Output shaft 38 includes a journalled output portion 43 adapted to receive a suitable mechanism to be driven by the shaft. An annular seal 44 is positioned in counterbore 17 of valve housing 10 within annular groove 45 and serves to prevent leakage of operating fluid through this opening. An additional seal 46 is secured in groove 47. A front thrust bearing assembly 48 abuts shoulder 49 of valve housing section 10 and is sandwiched between the shoulder and front roller bearing 41. A rear thrust bearing 50 is assembled in socket 51 in valve plate section 11, and is sandwiched between socket 51 and rear sleeve bearing 40 and output shaft 38. The thrust bearings are commercially available.

The valve is joined to the shaft by a connecting pin 52. Connecting pin 52 projects radially outwardly from output shaft 38 and is received in slot 53 in valve 31. Pin 52, if desired, may be sized and used as a shear pin. If the valve jams relative to the housing, the pin will shear, separating the driving shaft from the driven valve, stalling the motor and preventing further damage to the components. It should be noted that slot 53 allows for axial movement of connecting pin 52 relative to valve 31, thereby preventing any misalignment of output shaft 38 in valve housing 10 from affecting the axial alignment of valve 31.

A drive member 54 constructed of hardened steel joins output shaft 38 with the gerotor set 12 by connection to the star member 25. This drive member is elongate, having its axis 55 oriented generally along motor axis 16, but at a slight angle thereto to accommodate the eccentricity of star member 25 relative to ring member 24. Drive member 54 is always in this slightly angulated position relative to motor axis 16 as it functions during operation of the motor. Drive member 54 includes rear head element 56 and front head element 57. Rear and front head elements 56 and 57 have frustospherically shaped splines which are equal in number to and mesh with corresponding rear internal splines 58 in star member 25 and front internal splines 59 in shaft bore 39. Since drive member rear head element 56 is positioned in star member 25 which rotates and orbits, this end has both orbiting and rotational movement. However, drive member front head element 57 is positioned in output shaft 38 and rotates only. The frustospherically shaped heads and the spline connections function as a type of universal joint which allows this movement for drive member 54, providing means to cancel the orbiting motion of the star, translating only the rotation motion thereof. The star rotates at the same r.p.m. as the valve, the shaft and the drive member. However, the star orbits six times about the motor axis 16 for each revolution of the star about its own axis.

A drive member positioning ring 60 is located in bore 39 of output shaft 38 and rotates therewith retaining drive member 54 in proper position relative to star member 25 and output shaft 38. The drive member positioning ring 60 includes an opening (not shown herein) whereby oil which leaks through the internal high pressure interfaces may pass into conduit 61 and thence to passages 62 and 63, providing lubrication to roller bearing 41. Lubrication to rear sleeve bearing 40 is supplied by oil which leaks through the internal high pressure interfaces. The spline connections of drive member 54 to output shaft 38 and star member 25 are also lubricated from oil leakage.

Figure 4:
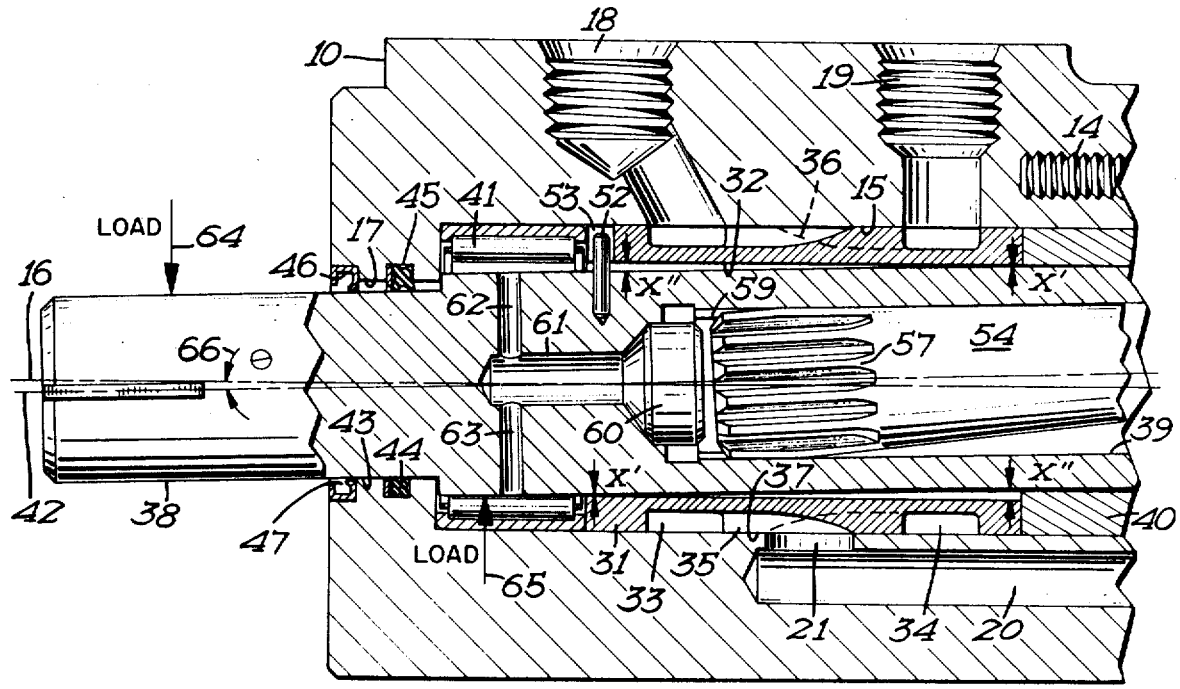
FIG. 4 is a partial longitudinal sectional view of the fluid operated motor of FIG. 1 showing misalignment of the shaft caused by radial load and subsequent wear on the shaft and bearings, exaggerated for purposes of clarity.

The effects of low tolerance support of the shaft and wear between the shaft and the supporting bearings and the resulting misalignment of the shaft relative to the valve are best shown by reference to FIG. 4.

A radial load is indicated on the output shaft 38 at numeral 64. Corresponding reaction forces of the upward bearing on the shaft are indicated at 65. The shaft axis 42 is displaced from the motor or housing axis 16 by angle θ indicated at 66. This angular displacement causes the spacing between output shaft 38 and valve 31 to be decreased as indicated by dimension X′, and increased by the dimension indicated at X″ as compared to dimension X in FIG. 1. When dimension X′ is reduced to zero, the bearings or shaft may be changed as necessary with little difficulty. There is no decrease in efficiency of the motor as dimension X decreases to X′. After this dimension is reduced to zero, of course, the valve functions as a bearing and inefficiencies result.

Figure 5:
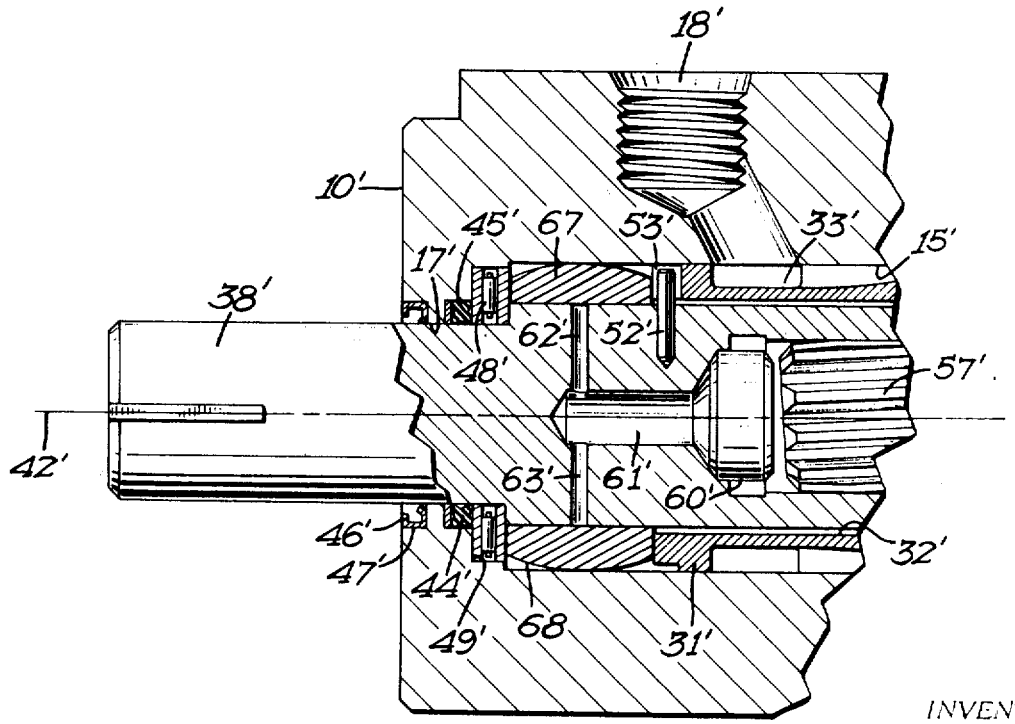
FIG. 5 is a partial sectional view of an alternate bearing configuration for the output shaft of the motor of FIG. 1.

An alternate embodiment of the front bearing arrangement for the motor shaft is shown in FIG. 5. Housing 10′ includes a valve receiving bore 15′ with shaft 38′ having centerline 42′ aligned with motor axis 16′ assembled in bore 15′. Bearing 67 supports the shaft in bore 15′ and includes convex surface 68 in contact with the surface of bore 15′. Convex surface 68 provides a self-aligning surface whereby shaft 38′ can be angularly displaced relative to mtoor axis 16′ and yet be supported for rotation in the housing. Under radial load, the shaft may deflect somewhat and convex surface 68 provides means for properly supporting the shaft under the deflection caused by the load without affecting the free rotation of valve 31′.

Figure 6:
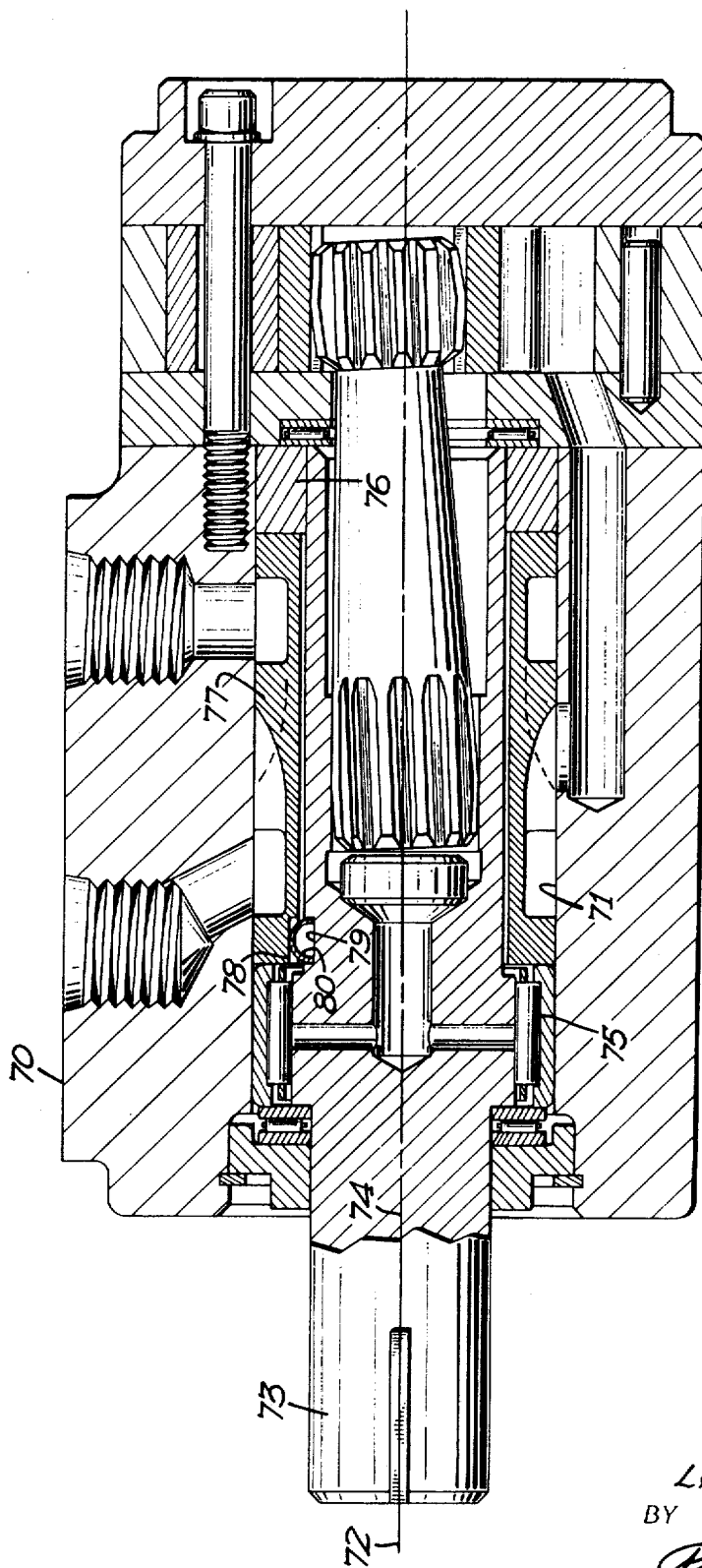
FIG. 6 is a longitudinal section of a further embodiment of a fluid operated motor.

Another alternate embodiment of the fluid operated motor of this invention is shown in FIG. 6. Housing 70 includes bore 71 having centerline 72 which may also be termed a motor axis. Shaft 73, having an axis 74 is positioned in bore 71 for rotation therein and supported by front roller bearings 75 and rear sleeve bearing 76. A valve 77 is concentric with shaft 73 and rotates about the motor axis 2.

Valve 77 includes a spring receiving socket 8 and shaft 73 includes a similar spring receiving socket 79 adapted to mate with the receiving socket of valve 77. A spring assembly 80 is caged in mating sockets 78 and 79 providing detachable connection between valve 77 and shaft 73. In the event an obstruction prevents free rotation of valve 77, spring 80 collapses in socket 79 of shaft 73, allowing the motor to stall preventing further damage to the components thereof.

Since the general operation of a fluid operated axial valve motor is well known in the art, it will be discussed only briefly herein for purposes of more completely describing the operation of the invention.

Fluid under pressure, for example oil, enters port 18 and is conducted to annular groove 33 in valve member 31. The fluid under pressure is then conveyed through slot 35, into opening 21 and then to passages 20 in valve housing 10. Passages 20 are in fluid communication with predetermined cells 29 in the gerotor mechanism 12 with valve plate 11 and its corresponding openings 23 positioned between displacement mechanism 12 and valve housing 10 with openings 23 in fluid communication with corresponding passages 20 in the valve housing. Fluid under pressure is conveyed to cells 29 on one side of line of eccentricity 30, causing the gerotor star member 25 to rotate and orbit.

Drive member 54 connects output shaft 38 with star member 25 and the rotational movement of the star is transmitted to the shaft by the drive member. Valve 31 is connected to shaft 38 by drive pin 52 and the valve rotates in synchronism with the star member. A commutator action is thereby established and fluid under pressure is conveyed to cells 29 in a predetermined pattern. Simultaneously, fluid is exhausted from cells 29 on the opposite side of line of eccentricity 30 through passages 23 in valve plate 11 and then through corresponding passages 20 in housing 10. The exhaust fluid ultimately passes through predetermined openings 21 into exhaust fluid slots 36 to be ultimately exhausted through annular groove 34 in fluid communication with port 19. As long as fluid is provided to inlet port 18, this operation is sustained and power may be taken off at output shaft 38.

It is of the utmost importance that a fluid operated motor be confined in the smallest possible frame and consequently, it has been found desirable to design the drive member, the output shaft and the valve to be substantially concentric.

As shown in FIG. 1, valve 31 is concentric with shaft 38, is positioned between bearings 40 and 41 and is separated a predetermined distance from shaft 38 as noted by dimension X. The inside diameter of valve 31 is on the order of two percent greater than the outside diameter of shaft 38 along the concentric portions. Shaft 38 is supported in housing 10 by bearing 40 at the terminal end thereof and front bearing 41 at the other end thereof for rotation substantially along frame longitudinal axis 16. Valve 31 is in precision rotative fit with bore 15 of housing 10 and takes its alignment therefrom. Valve 31 rotates about frame axis 16 and, for most efficient operation must remain in precision rotative fit relative to the housing, independent of the alignment of shaft 38.

Many factors affect the alignment of shaft 38 within housing 10 along axis 16. For example, known bearings do not have sufficient tolerances such that the shaft 38 rotates within the rear and front bearing 40 and 41 respectively maintaining a shaft axis 42 precisely along axis 16 of the motor. Further, wear in the supporting bearings or wear of the shaft surfaces in contact with the bearings also causes misalignment of shaft axis 42 relative to longitudinal axis 16. Still further, a side load 64 may be exerted on output shaft 38 further affecting the alignment of the shaft within the housing.

As seen in FIG. 4, a combination of lack of bearing tolerance, wear between the bearings and the shaft supported in the bearings, and a load 64, has displaced shaft 38 as shown by the angle denoted at 66 between motor longitudinal axis 42. This has resulted in dimension X being reduced to X′, the point at which the output shaft finally contacts the valve member. At the point in time at which dimension X is decreased to dimension X′, as shown in FIG. 4, load 64 must be decreased, the bearings must be replaced or the shaft must be replaced, as appropriate. This will then prevent damage to the valve and prevent the valve from being used as a bearing surface doing further damage to the motor from excess loads or excess wear between the moving parts.

It should be noted that the drive pin 52 may be utilized as a shear pin to prevent damage to the moving parts of the motor in the event an excess force is created between the valve and output shaft. The force at which damage would result can be calculated by known methods and the drive pin sized accordingly. Upon failure of the drive pin, the valve is separated from the output shaft and consequently, the motor stalls.

The valve drive mechanism may comprise the mechanism shown in FIG. 6 wherein valve 77 includes spring receiving socket 78 and output shaft 73 includes a spring receiving socket 79 mating with the spring receiving socket 78 of valve 77. A drive spring 80 is caged in said mating sockets. The force at which it is desired for the valve to separate from the shaft and stall the motor may be calculated by known means and the spring may be sized accordingly to collapse into either socket 78 or 79 under the predetermined force.

Since it is known that the output shaft is subject to misalignment, FIG. 5 shows an alternate bearing construction which compensates for this misalignment while continuing to support the output shaft 38'. Bearing 67 includes a convex surface 68 in contact with bore 15' of housing 10' whereby output shaft 38' is adequately supported at such times as shaft axis 42' deviates from the longitudinal axis of the motor.

It should be noted that the fluid operated motor described herein may be reversibly operated as a motor as well as operated in either direction of rotation depending upon the circuitry of the installation in which the motor described herein is applied. Further, it should be noted that the motor described herein is usable as a pump by simply putting power into the output shaft and taking the fluid pumped from the proper motor port.

From the foregoing it will be seen that I have provided a fluid operated motor of the axial valve type wherein the output shaft is capable of withstanding high side or radial loads without affecting the efficient operation of the valve member. Further, the operation of the valve member is not affected by misalignment of the output shaft which drives the valve member and provision is made for wear between the moving parts without the wear affecting the efficient operation of the motor in any way whatsoever.

It will, of course, be understood that various changes may be made in the form, details, arrangement and proportions of the various parts without departing from the scope of this invention.

What is claimed is:

1. A fluid operated motor of the axial valve type, said motor comprising
   a generally cylindrically shaped frame having a longitudinal axis,
   a gerator type displacement mechanism mounted in said frame and having an internally toothed ring member having an axis coextensive with the longitudinal axis of said frame and in fixed relation thereto, and an externally toothed star member having at least one less tooth than said ring member and having an axis, said star member disposed eccentrically in said ring member for orbital movement about the axis of said ring member and rotational movement about its own axis in the opposite direction from and at a slower speed than said orbital movement during relative movement between said members,
   an output shaft rotatably mounted in said frame for rotation substantially about the longitudinal axis thereof, said output shaft supported by a forward bearing at the output end thereof, said output shaft having a drive member receiving opening therein generally concentric with the longitudinal axis of said frame,
   a drive member connecting said displacement mechanism with said output shaft, said drive member having a rear star member engaging portion and a front drive member engaging portion providing universal joint means between said output shaft and said displacement mechanism, said drive member transmitting rotational movement of said star member to said shaft in synchronism therewith and cancelling the orbiting movement of said star member relative to said output shaft,
   a valve member rotatably mounted in said frame for rotation at the longitudinal axis thereof, in precision rotative fit relative to said frame and taking its alignment therefrom, said valve member positioned concentric with said output shaft adjacent the forward bearings thereof, said valve member having an inside diameter greater than the outside diameter of said output shaft whereby said valve member is spaced a predetermined distance from said output shaft and is thereby independent of the alignment of said output shaft relative to said frame and
   a valve connecting mechanism connecting said valve with said shaft for synchronous rotation with said displacement mechanism whereby fluid is provided to and exhausted from said displacement mechanism in a predetermined sequence.

2. The fluid operated motor of claim 1 wherein,
   said output shaft is rotatably mounted in said frame for rotation substantially about the longitudinal axis thereof, supported by a forward bearing at the output end thereof and a rearward bearing at the terminal end thereof.

3. The fluid operated motor of claim 1 wherein,
   said value member has an inner diameter substantially two percent greater than the outer diameter of said output shaft along the concentric portions thereof.

4. The fluid operated motor of claim 1 wherein,
   said valve connecting mechanism comprises a drive pin inserted in said output shaft projecting radially outwardly therefrom and
   said valve member includes a pin receiving slot having said drive pin inserted therein in driving relation relative thereto.

5. The fluid operated motor of claim 4 wherein said valve member includes an axially elongate pin receiving slot whereby said pin is axially movable relative to said valve member whereby axial misalignment of said output shaft is not transmitted to said valve member.

6. The fluid operated motor of claim 4 wherein said drive pin has a predetermined diameter whereby said drive pin shears under a predetermined force between said valve member and said output shaft.

7. The fluid operated motor of claim 1 wherein said valve connecting mechanism comprises
   an output shaft having a spring receiving socket therein adapted to cage a spring projecting outwardly therefrom and, said valve member includes a spring receiving socket mating with the spring receiving socket of said output shaft and
   a spring positioned in said mating sockets connecting said valve member with said output shaft, said spring collapsible into one of the mating sockets under a predetermined force between said valve member and said output shaft thereby separating said valve member and said output shaft.

8. The fluid operated motor of claim 1 wherein,
   said output shaft is rotatably mounted in said frame for rotation substantially about the longitudinal axis thereof, and said output shaft is supported by a forward bearing at the output end thereof,
   said forward bearing having a convex bearing surface whereby said output shaft receives support therefrom at such times as the alignment of said output shaft deviates from the longitudinal axis of said frame.

References Cited

UNITED STATES PATENTS

| | | | |
|---|---|---|---|
| Re. 25,126 | 2/1962 | Charlson | 91—56 XR |
| 3,348,493 | 10/1967 | Easton | 103—130 |
| 3,352,247 | 11/1967 | Easton | 103—130 |
| 3,452,543 | 7/1969 | Goff et al. | 91—56 XR |

EVERETTE A. POWELL, JR., Primary Examiner